United States Patent
Nishida et al.

(10) Patent No.: US 9,127,750 B2
(45) Date of Patent: Sep. 8, 2015

(54) CONTROL DEVICE FOR AUTOMATIC TRANSMISSION

(71) Applicants: Naofumi Nishida, Toyota (JP); Shinichi Ito, Anjo (JP)

(72) Inventors: Naofumi Nishida, Toyota (JP); Shinichi Ito, Anjo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/404,566

(22) PCT Filed: Jul. 25, 2013

(86) PCT No.: PCT/IB2013/001617
§ 371 (c)(1),
(2) Date: Nov. 28, 2014

(87) PCT Pub. No.: WO2014/020399
PCT Pub. Date: Feb. 6, 2014

(65) Prior Publication Data
US 2015/0148158 A1    May 28, 2015

(30) Foreign Application Priority Data

Aug. 1, 2012  (JP) .................................. 2012-171118

(51) Int. Cl.
| | |
|---|---|
| F16H 61/02 | (2006.01) |
| F16H 9/12 | (2006.01) |
| F16H 61/662 | (2006.01) |
| F16H 59/72 | (2006.01) |
| F16H 61/00 | (2006.01) |

(52) U.S. Cl.
CPC .............. *F16H 9/12* (2013.01); *F16H 61/0251* (2013.01); *F16H 61/662* (2013.01); *F16H 61/66272* (2013.01); *F16H 59/72* (2013.01); *F16H 2061/0078* (2013.01); *F16H 2061/0096* (2013.01); *F16H 2061/0258* (2013.01)

(58) Field of Classification Search
None
See application file for complete search history.

(56) References Cited

U.S. PATENT DOCUMENTS

2009/0183777 A1* 7/2009 Herman et al. .................. 137/2

FOREIGN PATENT DOCUMENTS

| | | |
|---|---|---|
| JP | A-06-207658 | 7/1994 |
| JP | A-10-340104 | 12/1998 |
| JP | A-11-248026 | 9/1999 |
| JP | A-2000-009222 | 1/2000 |
| JP | A-2005-090251 | 4/2005 |
| JP | A-2010-270798 | 12/2010 |

* cited by examiner

*Primary Examiner* — Erin D Bishop
(74) *Attorney, Agent, or Firm* — Oliff PLC

(57) ABSTRACT

A control device for an automatic transmission including a hydraulic actuator that is actuated on the basis of a hydraulic pressure supplied and a linear solenoid valve that controls the hydraulic pressure supplied to the hydraulic actuator on the basis of a driving current of a solenoid includes an ECU that executes current feedback control over a current value of the driving current that is flowed to the solenoid using at least a proportional term and an integral term on the basis of a deviation (ΔI) between a target current value (Itgt) and actual current value (Ir) of the solenoid such that the hydraulic pressure supplied to the hydraulic actuator becomes a target hydraulic pressure. The ECU increases a proportional gain (Kp) in the current feedback control as a fluid temperature (To) detected by a fluid temperature sensor increases.

4 Claims, 3 Drawing Sheets

| 210 | | | | | | | |
|---|---|---|---|---|---|---|---|
| | | FLUID TEMPERATURE(°C) | | | | | |
| | Kp | LOW ←→ HIGH | | | | | |
| CURRENT (A) LOW ↕ HIGH | LOW ↕ HIGH | f | e | b | b | a | a | a |
| | | f | e | b | b | a | a | a |
| | | f | e | b | b | a | a | a |
| | | f | e | b | b | a | a | a |
| | | f | e | c | c | b | b | b |
| | | f | e | d | d | c | c | c |

CONTROL DEVICE FOR AUTOMATIC TRANSMISSION

BACKGROUND OF THE INVENTION

1. Field of the Invention

The invention relates to a control device for an automatic transmission.

2. Description of Related Art

Generally, various hydraulic actuators are equipped for an automatic transmission that is mounted on a vehicle. For example, a belt-drive continuously variable transmission (CVT) that steplessly changes a speed ratio includes various hydraulic actuators including hydraulic cylinders respectively provided at a movable sheave of a primary pulley and a movable sheave of a secondary pulley.

Such hydraulic actuators are actuated through control over hydraulic control valves that operate using control hydraulic pressures as pilot pressures. The control hydraulic pressures are respectively supplied from solenoid valves. Each of these solenoid valves adjusts the control hydraulic pressure that is supplied to a corresponding one of the hydraulic actuators on the basis of a signal that is input from an electronic control unit. Thus, a speed ratio, a belt clamping pressure, a line pressure, a lockup engagement pressure, and the like, are adjusted to optimal values as needed.

For example, a belt clamping pressure control valve is connected to the hydraulic cylinder of the secondary pulley. By controlling the line pressure that is supplied to the belt clamping pressure control valve using the control hydraulic pressure output from the corresponding solenoid valve as the pilot pressure, the belt clamping pressure is controlled. Such a belt clamping pressure is desirably controlled to an optimal value such that a belt slip does not occur.

There is known a control device for an automatic transmission, which executes feedback control over a current flowing through a solenoid of a solenoid valve such that an actual line pressure (hereinafter, referred to as actual line pressure) converges to a target line pressure on the basis of a difference between the target line pressure and the actual line pressure detected by a hydraulic pressure sensor in order to optimally control the belt clamping pressure (for example, see Japanese Patent Application Publication No. 2010-270798 (JP 2010-270798 A)).

SUMMARY OF THE INVENTION

In the control device for an automatic transmission, described in JP 2010-270798 A, setting a proportional gain to an optimal value in feedback control on the basis of, for example, the temperature of hydraulic fluid (hereinafter, referred to as fluid temperature) that is supplied to the solenoid valve, a current command value of the solenoid, or the like, is not considered at all.

That is, when the proportional gain of feedback control is set to a constant value, it is not possible to execute appropriate feedback control on the basis of, for example, whether the fluid temperature is high or low or whether the current command value is large or small.

For example, when the proportional gain is small at a high fluid temperature, the response of current flowing through the solenoid delays, and an integral term in feedback control increases by the time when the target current command value coincides with an actual current value (hereinafter, referred to as actual current value). Therefore, an overshoot and undershoot of current are repeated after the actual current value coincides with the current command value, and hunting of current occurs. Such hunting of current can become a cause of a belt slip.

On the other hand, when the proportional gain increases at a low fluid temperature or in a high current range, a period of time during which the duty value of the solenoid indicates 100% tends to be long. Therefore, current sticks to a maximum value. When current sticks to the maximum value, the belt clamping pressure becomes a minimum pressure in the case where the solenoid valve is of a normally open type and, as a result, a belt slip may occur. In addition, in the case where the solenoid valve is of a normally closed type, the belt clamping pressure is increased more than necessary, and the durability of the belt may be influenced.

In addition, the above-described hunting of current or sticking of current to the maximum value can occur not only in the solenoid valve that controls the belt clamping pressure but also in solenoid valves that respectively control the speed ratio, the line pressure and the lockup engagement pressure. When hunting of current or sticking of current to the maximum value occurs in any one of these solenoid valves, it is not possible to obtain a desired speed ratio or it is not possible to keep an optimal lockup engagement pressure.

The invention provides a control device for an automatic transmission, which is able to suppress hunting of current or sticking of current to a maximum value in feedback control over a current value of a solenoid valve that controls a hydraulic actuator.

An automatic transmission according to an aspect of the invention includes i) a hydraulic actuator that is actuated on the basis of a hydraulic pressure supplied and ii) a solenoid valve that controls the hydraulic pressure supplied to the hydraulic actuator by outputting an input hydraulic pressure regulated on the basis of a driving current of a solenoid. The aspect of the invention relates to a control device for the automatic transmission. The control device includes: a fluid temperature detecting unit configured to detect a temperature of hydraulic fluid that is supplied to the hydraulic actuator; and a control unit configured to execute feedback control over a current value of the driving current that is flowed to the solenoid using at least a proportional term and an integral term on the basis of a deviation between a target current value of the driving current to be flowed to the solenoid and a current value of the driving current actually flowed to the solenoid such that the hydraulic pressure supplied to the hydraulic actuator becomes a target hydraulic pressure. The control unit is configured to increase a proportional gain in the feedback control as the temperature of the hydraulic fluid, detected by the fluid temperature detecting unit, increases.

With this configuration, the control device according to the invention increases the proportional gain in the feedback control as the temperature of the hydraulic fluid increases, so it is possible to increase the response of current flowing through the solenoid in the case where the temperature of the hydraulic fluid is high. Thus, it is possible to prevent an excessively large integral term in the feedback control. Thus, it is possible to suppress hunting of current due to an excessively large integral term in the feedback control.

In the case where the temperature of the hydraulic fluid is low, the proportional gain in the feedback control is reduced, so it is possible to prevent an excessively high duty value of the solenoid. Thus, it is possible to suppress sticking of current, flowing to the solenoid, to a maximum value.

In the control device according to the invention, the control unit may be configured to reduce the proportional gain in the feedback control as the target current value increases.

With this configuration, the control device according to the invention reduces the proportional gain in the feedback control as the target current value increases, so it is possible to reduce the proportional gain in a high current range in which the duty value of the solenoid easily increases. Therefore, it is possible to prevent an excessively high duty value of the solenoid in a high current range in which the target current value is high. Thus, it is possible to suppress sticking of current, flowing to the solenoid, to a maximum value.

In the control device according to the invention, the automatic transmission may be a belt-drive continuously variable transmission including i) a primary pulley configured to vary a winding radius of a belt by varying a groove width of the primary pulley and ii) a secondary pulley configured to generate a belt clamping pressure for clamping the belt, and the automatic transmission may be connected to a driving force source via a lockup clutch, and at least one of shift of the belt-drive continuously variable transmission, the belt clamping pressure, an engagement pressure of the lockup clutch and a line pressure may be controlled through the solenoid valve.

With this configuration, the control device according to the invention is able to suppress hunting of current and sticking of current to the maximum value in the feedback control over the current flowing to the solenoid valve that is used in each of shift control, belt clamping pressure control, control over the engagement pressure of the lockup clutch and control over the line pressure. Thus, it is possible to obtain a desired speed ratio in the solenoid valve that is used in shift control. In addition, when the solenoid valve that is used in belt clamping pressure control is, for example, a normally open solenoid valve, it is possible to suppress occurrence of a belt slip. In addition, it is possible to keep an optimal lockup clutch engagement pressure in the solenoid valve that is used in control over the engagement pressure of the lockup clutch. Furthermore, it is possible to suppress fluctuations in the line pressure in the solenoid valve that is used in control over the line pressure.

In the control device according to the invention, the solenoid valve may be a normally open solenoid valve, and the belt clamping pressure may be controlled through the solenoid valve. In addition, in the control device according to the invention, the solenoid valve may be a normally closed solenoid valve, and the belt clamping pressure may be controlled through the solenoid valve.

According to the invention, it is possible to provide the control device for the automatic transmission, which is able to suppress hunting of current or sticking of current to the maximum value in the feedback control over the current value of the solenoid valve that controls the hydraulic actuator.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, an embodiment of the invention will be described with reference to the accompanying drawings.

In the present embodiment, description will be made on the case where the control device for an automatic transmission according to the invention is applied to, for example, a vehicle on which a torque converter with a lockup clutch is installed between an internal combustion engine, such as an engine, and a transmission.

In the present embodiment, description will be made on an example in which a continuously variable transmission (hereinafter, simply referred to as CVT) is employed as the automatic transmission.

First, a power train of the vehicle on which the control device according to the embodiment of the invention is mounted will be described with reference to FIG. 1.

Figure 1:
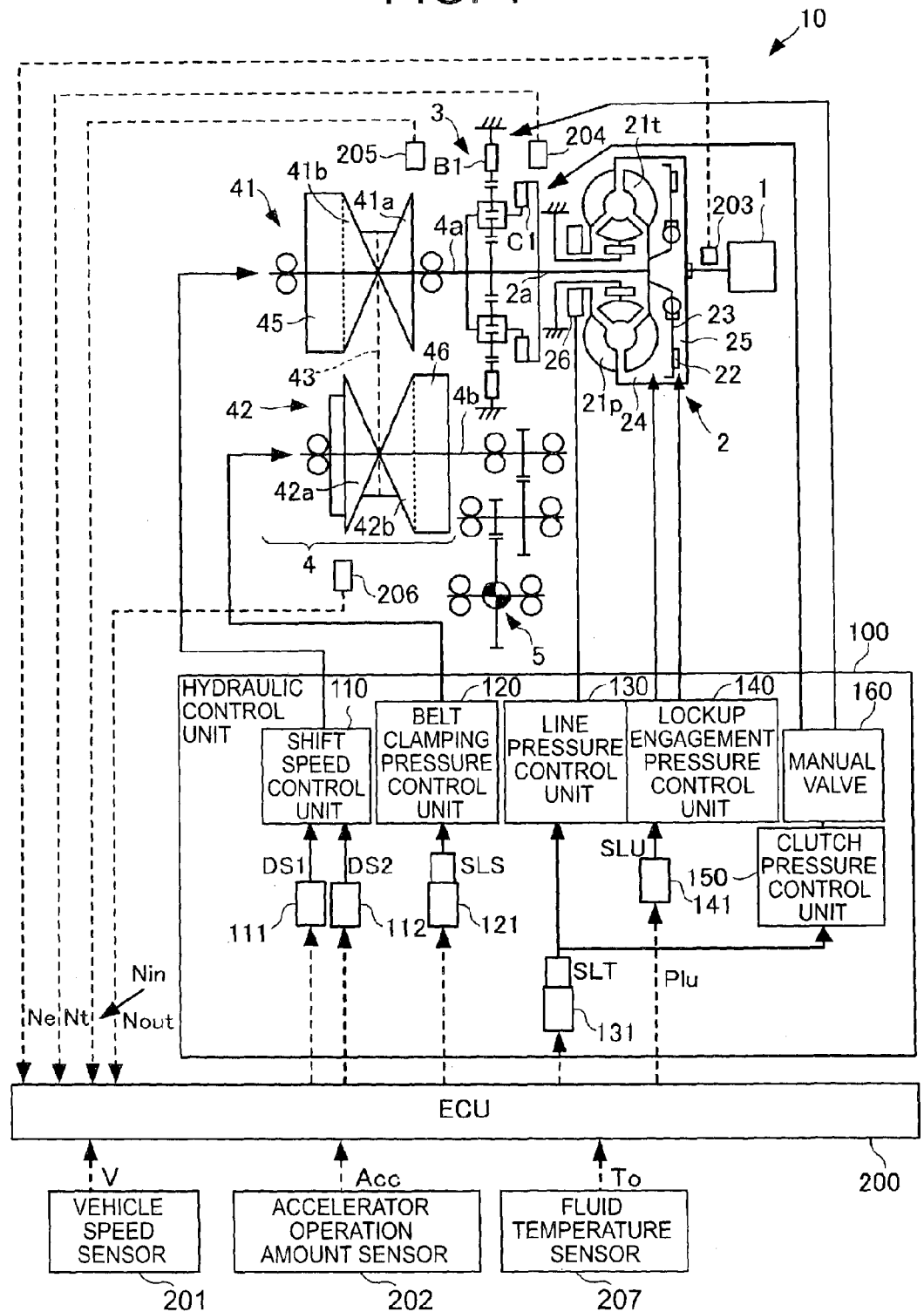
FIG. 1 is a schematic configuration view of a power train of a vehicle according to an embodiment of the invention.

As shown in FIG. 1, the power train 10 includes an engine 1 that serves as an internal combustion engine, a torque converter 2, a forward/reverse switching device 3, a CVT 4, a differential gear 5, a hydraulic control circuit 100 and an electronic control unit (hereinafter, simply referred to as ECU) 200.

A known power unit is used as the engine 1. The power unit outputs power by burning a mixture of hydrocarbon fuel, such as gasoline and light oil, and air in a combustion chamber of a cylinder (not shown). The engine 1 in the present embodiment can be regarded as one example of a driving force source according to the invention.

The engine 1 reciprocally moves a piston in the cylinder by repeating a series of intake stroke, compression stroke, combustion stroke and exhaust stroke on an air-fuel mixture in the combustion chamber, thus rotating a crankshaft (not shown). The crankshaft serves as an output shaft coupled to the piston such that power is transmittable.

The crankshaft of the engine 1 is connected to an input shaft of the torque converter 2. The output of the engine 1 is transmitted from the crankshaft and the torque converter 2 to the differential gear 5 via the forward/reverse switching device 3, an input shaft 4a and the CVT 4, and is distributed to right and left drive wheels (not shown).

The torque converter 2 includes a pump impeller 21p coupled to the crankshaft of the engine 1, and a turbine impeller 21t coupled to the forward/reverse switching device 3 via a turbine shaft 2a. The torque converter 2 transmits power via fluid.

In addition, a lockup clutch 22 is provided between the pump impeller 21p and turbine impeller 21t of the torque converter 2. An engagement-side fluid chamber 24 and a release-side fluid chamber 25 partitioned by a piston 23 are defined inside the torque converter 2.

The lockup clutch 22 is engaged or released by switching supply of hydraulic pressure to the engagement-side fluid chamber 24 and the release-side fluid chamber 25 with the use of a selector valve, or the like, of the hydraulic control circuit 100 (described later).

While the lockup clutch 22 is engaged, the crankshaft of the engine 1 is directly coupled to the turbine shaft 2a, and power output from the engine 1 is directly transmitted to the CVT 4 side not via fluid in the torque converter 2. On the other hand, while the lockup clutch 22 is released, power output from the engine 1 is transmitted to the CVT 4 side via fluid.

The pump impeller 21p includes an oil pump 26 that operates in response to rotation of the pump impeller 21p. The oil pump 26 is, for example, formed of a mechanical oil pump, such as a gear pump, and supplies hydraulic pressure to various linear solenoid valves of the hydraulic control circuit 100.

The forward/reverse switching device 3 is provided in a power transmission path between the torque converter 2 and the CVT 4, and is mainly formed of a double-pinion-type planetary gear unit. The forward/reverse switching device 3 includes a forward clutch C1 and a reverse brake B1, each of which is formed of a hydraulic friction engagement device that is frictionally engaged by a hydraulic cylinder.

When the forward clutch C1 is engaged and the reverse brake B1 is released, the forward/reverse switching device 3 is set in an integrally rotatable state. At this time, a forward power transmission path is established, and forward driving force is transmitted to the CVT 4 side.

On the other hand, when the reverse brake B1 is engaged and the forward clutch C1 is released, the forward/reverse switching device 3 establishes a reverse power transmission path that causes the input shaft 4a to rotate in an opposite direction with respect to the turbine shaft 2a. Thus, reverse driving force is transmitted to the CVT 4 side.

When both the forward clutch C1 and the reverse brake B1 are released, the forward/reverse switching device 3 is set in a neutral state (interrupted state) where power transmission is interrupted.

The CVT 4 includes an input-side primary pulley 41 of which the effective diameter is variable, an output-side secondary pulley 42 of which the effective diameter is variable and a metal transmission belt 43 wound between these pulleys. The CVT 4 transmits power via the friction force between the transmission belt 43 and the primary pulley 41 provided at the input shaft 4a and the friction force between the transmission belt 43 and the secondary pulley 42 provided at an output shaft 4b. The CVT 4 is connected to the engine 1 via the forward/reverse switching device 3 and the lockup clutch 22.

The primary pulley 41 includes a fixed sheave 41a fixed to the input shaft 4a and a movable sheave 41b provided so as to be relatively non-rotatable about its axis and movable in an axial direction with respect to the input shaft 4a. The secondary pulley 42 includes a fixed sheave 42a fixed to the output shaft 4b and a movable sheave 42b provided so as to be relatively non-rotatable around its axis and movable in an axial direction with respect to the output shaft 4b.

The primary pulley 41 varies a winding radius of the transmission belt 43 by varying its groove width. The secondary pulley 42 generates a belt clamping pressure for clamping the transmission belt 43.

The transmission belt 43 is wound around a V-shaped pulley groove formed by the fixed sheave 41a and the movable sheave 41b and a V-shaped pulley groove formed by the fixed sheave 42a and the movable sheave 42b. The transmission belt 43 in the present embodiment can be regarded as one example of a belt according to the invention.

The primary pulley 41 includes a hydraulic actuator 45 for moving the movable sheave 41b in the axial direction. The secondary pulley 42 includes a hydraulic actuator 46 for moving the movable sheave 42b in the axial direction. Each of the hydraulic actuators 45, 46 is, for example, formed of a hydraulic cylinder.

The primary pulley 41 continuously varies the groove width of the pulley groove through control over a hydraulic pressure that is supplied to the hydraulic actuator 45. The secondary pulley 42 continuously varies the groove width of the pulley groove through control over a hydraulic pressure that is supplied to the hydraulic actuator 46. Thus, the corresponding winding radii of the transmission belt 43 are changed, and a speed ratio is continuously varied.

The hydraulic control circuit 100 includes a shift speed control unit 110, a belt clamping pressure control unit 120, a line pressure control unit 130, a lockup engagement pressure control unit 140, a clutch pressure control unit 150 and a manual valve 160.

The shift speed control unit 110 controls the hydraulic pressure that is supplied to the hydraulic actuator 45 of the primary pulley 41 on the basis of a hydraulic pressure that is output from a shift control first solenoid valve 111 and a hydraulic pressure that is output from a shift control second solenoid valve 112. That is, the shift speed control unit 110 controls the speed ratio of the CVT 4 through control over hydraulic pressures.

The belt clamping pressure control unit 120 controls the hydraulic pressure that is supplied to the hydraulic actuator 46 of the secondary pulley 42 on the basis of a hydraulic pressure that is output from a belt clamping pressure control linear solenoid valve 121. That is, the belt clamping pressure control unit 120 controls the belt clamping pressure through control over a hydraulic pressure.

The line pressure control unit 130 controls the line pressure on the basis of a hydraulic pressure that is output from a line pressure control linear solenoid valve 131. The line pressure indicates a hydraulic pressure that is supplied by the oil pump 26 and that is regulated by a regulator valve (not shown).

The lockup engagement pressure control unit 140 controls the engagement force of the lockup clutch 22, that is, a transmission torque, in response to a hydraulic pressure that is output from a lockup engagement pressure control linear solenoid valve 141. The lockup clutch 22 is controlled to any one of a released state, an engaged state and a slipped state (intermediate state between the released state and the engaged state) on the basis of the magnitude of the transmission torque.

The manual valve 160 operates in synchronization with driver's operation of a shift lever, and switches fluid passages.

The clutch pressure control unit 150 controls a hydraulic pressure that is supplied from the manual valve 160 to the input clutch C1 or the reverse brake B1 on the basis of the hydraulic pressure that is output from the line pressure control linear solenoid valve 131.

The above-described shift control first solenoid valve 111, shift control second solenoid valve 112, belt clamping pressure control linear solenoid valve 121, line pressure control linear solenoid valve 131 and lockup engagement pressure control linear solenoid valve 141 are connected to the ECU 200. Control signals are respectively supplied from the ECU 200 to these linear solenoid valves. The belt clamping pressure control linear solenoid valve 121 in the present embodiment can be regarded as one example of a solenoid valve according to the invention.

Each of the linear solenoid valves controls the hydraulic pressure that is output from the corresponding control unit by outputting a control hydraulic pressure on the basis of the control signal from the ECU 200, thus controlling a corresponding one of the hydraulic actuators serving as controlled objects. That is, the shift control first solenoid valve 111 and the shift control second solenoid valve 112 are used in shift control for controlling the speed ratio of the CVT 4. The belt clamping pressure control linear solenoid valve 121 is used to control the belt clamping pressure of the transmission belt 43. The line pressure control linear solenoid valve 131 is used to control the line pressure. The lockup engagement pressure control linear solenoid valve 141 is used to control the engagement pressure of the lockup clutch 22.

For example, the line pressure control linear solenoid valve 131 outputs the control hydraulic pressure to the line pressure control unit 130 and the clutch pressure control unit 150 on the basis of a current value that is determined on the basis of the duty value output from the ECU 200. The line pressure control linear solenoid valve 131 is a normally open-type solenoid valve.

The belt clamping pressure control linear solenoid valve 121 outputs the control hydraulic pressure to the belt clamping pressure control unit 120 on the basis of a current value that is determined on the basis of the duty value output from the ECU 200. Specifically, the belt clamping pressure control linear solenoid valve 121 regulates the input hydraulic pressure on the basis of a driving current of a solenoid 121a (see FIG. 2) (described later), and outputs the regulated hydraulic pressure as the control hydraulic pressure, thus controlling the hydraulic pressure supplied to the hydraulic actuator 46. The belt clamping pressure control linear solenoid valve 121, as well as the above-described line pressure control linear solenoid valve 131, is a normally open-type linear solenoid valve.

Here, the belt clamping pressure control unit 120 is formed of a belt clamping pressure control valve, and is supplied with the regulated line pressure fed under pressure from the oil pump 26. The belt clamping pressure control unit 120 adjusts hydraulic pressure that is supplied to the hydraulic actuator 46 on the basis of a variation in the control hydraulic pressure output from the belt clamping pressure control linear solenoid valve 121. The hydraulic actuator 46 is actuated on the basis of a hydraulic pressure that is supplied from the belt clamping pressure control unit 120.

For example, when the control hydraulic pressure that is output from the belt clamping pressure control linear solenoid valve 121 increases from a state where a predetermined hydraulic pressure is supplied to the hydraulic actuator 46, the hydraulic pressure that is supplied to the hydraulic actuator 46 increases, and the belt clamping pressure increases. On the other hand, when the control hydraulic pressure that is output from the belt clamping pressure control linear solenoid valve 121 decreases from a state where the predetermined hydraulic pressure is supplied to the hydraulic actuator 46, the hydraulic pressure that is supplied to the hydraulic actuator 46 decreases, and the belt clamping pressure decreases.

In this way, by regulating the line pressure using the control hydraulic pressure output from the belt clamping pressure control linear solenoid valve 121 as the pilot pressure, and supplying the regulated line pressure to the hydraulic actuator 46, the belt clamping pressure varies.

The control hydraulic pressure that is output from the belt clamping pressure control linear solenoid valve 121 is controlled in accordance with a map of a required hydraulic pressure (which corresponds to the belt clamping pressure) preset so as not to cause a belt slip using, for example, an accelerator operation amount Acc and a speed ratio γ (=Nin/Nout) as parameters.

Various sensors, such as a vehicle speed sensor 201, an accelerator operation amount sensor 202, an engine rotation speed sensor 203, a turbine rotation speed sensor 204, a primary pulley rotation speed sensor 205, a secondary pulley rotation speed sensor 206 and a fluid temperature sensor 207, are connected to the ECU 200.

The vehicle speed sensor 201 detects a vehicle speed V. The accelerator operation amount sensor 202 detects an operation amount of an accelerator pedal, that is, an accelerator operation amount Acc. The engine rotation speed sensor 203 detects the rotation speed of the pump impeller 21p, to which the rotation of the engine 1 is transmitted, as an engine rotation speed. The turbine rotation speed sensor 204 detects the rotation speed of the turbine shaft of the torque converter 2, that is, a turbine rotation speed Nt. The primary pulley rotation speed sensor 205 detects the rotation speed of the primary pulley 41, that is, a primary pulley rotation speed Nin. The secondary pulley rotation speed sensor 206 detects the rotation speed of the secondary pulley 42, that is, a secondary pulley rotation speed Nout.

The fluid temperature sensor 207 is, for example, formed of a thermistor type temperature sensor, and detects the fluid temperature To of the hydraulic control circuit 100. That is, the fluid temperature sensor 207 detects the temperature of hydraulic fluid that is supplied to the hydraulic actuators. The fluid temperature sensor 207 in the present embodiment can be regarded as one example of a fluid temperature detecting unit according to the invention. Detected signals that indicate detected results of these sensors are input from the sensors to the ECU 200.

The ECU 200 outputs control signals to the solenoid valves of the hydraulic control circuit 100 on the basis of the detected signals input from the above-described sensors. Thus, the control hydraulic pressures that are output from the solenoid valves are adjusted. The ECU 200 in the present embodiment can be regarded as one example of a control unit according to the invention.

Next, a configuration regarding feedback control over the driving current (hereinafter, referred to as current feedback control) of the belt clamping pressure control linear solenoid valve 121 according to the present embodiment will be described with reference to FIG. 2 and FIG. 3.

Figures 2, 3:
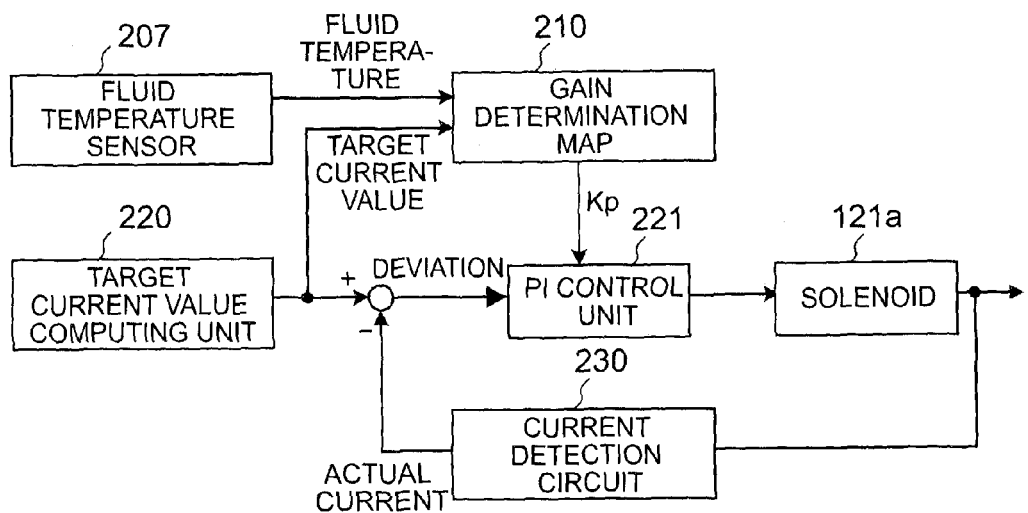
FIG. 2 is a control block diagram of feedback control over a linear solenoid for controlling a belt clamping pressure according to the embodiment of the invention.
FIG. 3 is a gain determination map according to the embodiment of the invention.

As shown in FIG. 2, the ECU 200 includes a gain determination map 210, a target current value computing unit 220, a PI control unit 221 and a current detection circuit 230 as the configuration regarding the above-described current feedback control. The belt clamping pressure control linear solenoid valve 121 includes a solenoid 121a that is driven at a driving current corresponding to a duty value that is output from the ECU 200.

As shown in FIG. 3, the gain determination map 210 is a three-dimensional map for determining a proportional gain Kp (indicated by a to f in the map) in current feedback control using a fluid temperature To (° C.) and a target current value Itgt (A) as parameters. The gain determination map 210 is empirically obtained in advance and stored in the ROM of the ECU 200.

Here, in the gain determination map 210 according to the present embodiment, as the fluid temperature To (° C.) detected by the fluid temperature sensor 207 increases, a larger proportional gain Kp is determined. That is, the ECU 200 increases the proportional gain Kp in current feedback control as the fluid temperature To (° C.) increases.

In addition, in the gain determination map 210, as the target current value Itgt (A) increases, a smaller proportional gain Kp is determined. That is, the ECU 200 reduces the proportional gain Kp in current feedback control as the target current value Itgt (A) increases.

The relationship among the proportional gains Kp in the gain determination map 210 is that a>b>c>d>e>f. That is, in the gain determination map 210 shown in FIG. 3, as the fluid temperature To (° C.) increases and as the target current value Itgt (A) decreases, a larger proportional gain Kp is determined. In addition, as the fluid temperature To (° C.) decreases and as the target current value Itgt (A) increases, a smaller proportional gain Kp is determined.

The target current value computing unit 220 calculates the target current value Itgt that should be flowed to the solenoid 121a on the basis of a required hydraulic pressure preset so as not to cause a belt slip, that is, a target hydraulic pressure Ptgt. The target hydraulic pressure Ptgt is calculated using a map empirically obtained and stored in advance using the speed ratio γ and the accelerator operation amount Acc as parameters. In addition, the target current value Itgt is calculated using a map in which the correlation between a target hydraulic pressure Ptgt and a target current value Itgt is empirically obtained and stored in advance.

The belt clamping pressure control linear solenoid valve 121 adjusts the control hydraulic pressure that is supplied to the belt clamping pressure control unit 120 by driving the solenoid 121a on the basis of the thus calculated target current value Itgt.

The PI control unit 221 executes feedback control over the current value of the driving current flowing through the solenoid 121a using a proportional term and an integral term on the basis of a deviation ΔI between the target current value Itgt of the driving current that should be flowed to the solenoid 121a and the current value of the driving current actually flowed to the solenoid 121a (hereinafter, referred to as actual current value Ir) such that the hydraulic pressure that is supplied to the hydraulic actuator 46 becomes the target hydraulic pressure Ptgt.

The PI control unit 221 uses the proportional gain Kp determined from the above-described gain determination map 210 as the proportional gain in the feedback control.

The current detection circuit 230 detects the actual current value Ir from, for example, a voltage applied between both ends of a resistor (not shown) connected to a ground side of the solenoid 121a.

Next, current feedback control that is executed by the ECU 200 according to the present embodiment will be described with reference to FIG. 4.

The current feedback control is repeatedly executed by the ECU 200 at predetermined time intervals.

Figure 4:
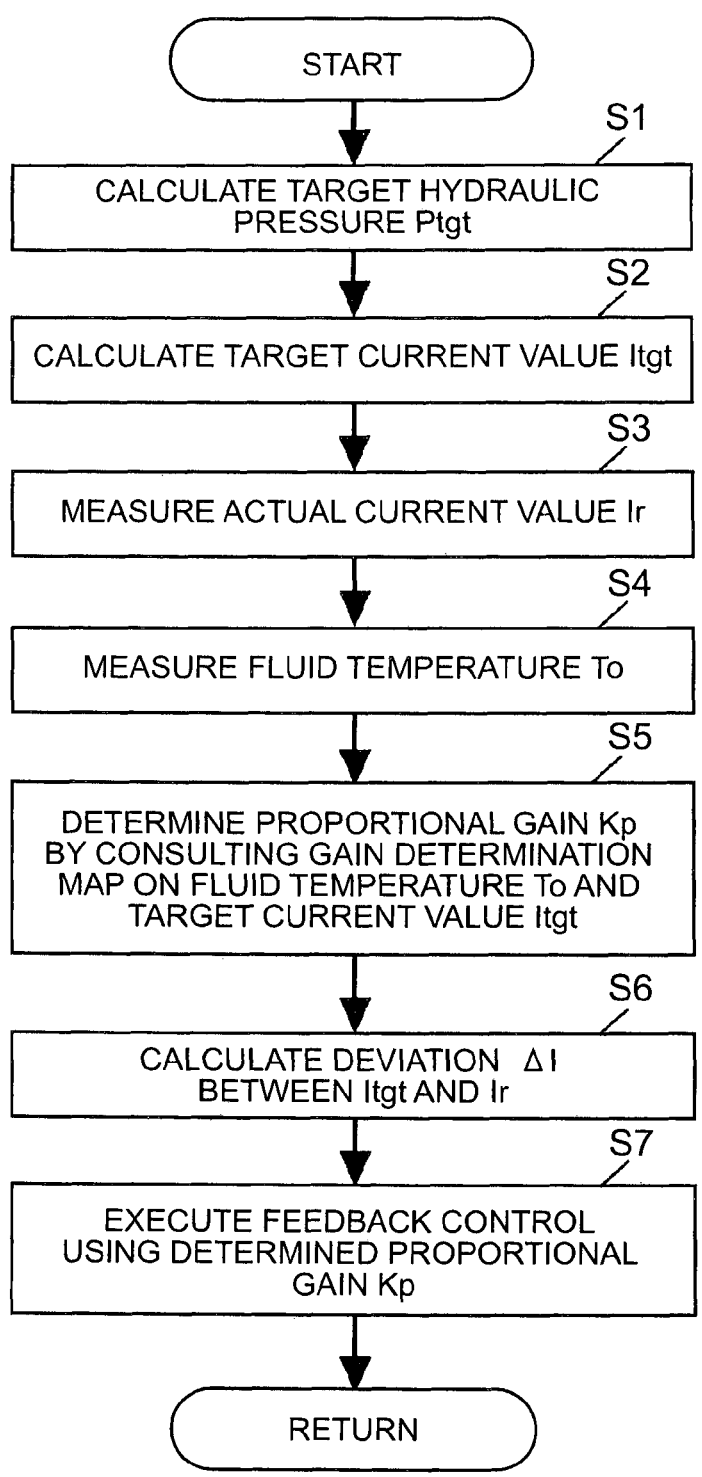
FIG. 4 is a flowchart that shows the flow of a series of processes of current feedback control that is executed by an ECU according to the embodiment of the invention.

As shown in FIG. 4, initially, the ECU 200 calculates the target hydraulic pressure Ptgt on the basis of the speed ratio γ and the accelerator operation amount Acc (step S1).

Subsequently, the ECU 200 calculates the target current value Itgt on the basis of the target hydraulic pressure Ptgt calculated in step S1 (step S2), and measures the actual current value Ir of the solenoid 121a through the current detection circuit 230 (step S3).

Then, the ECU 200 measures the fluid temperature To of the hydraulic control circuit 100 through the fluid temperature sensor 207 (step S4).

After that, the ECU 200 determines the proportional gain Kp by consulting the gain determination map (see FIG. 3) on the fluid temperature To measured in step S4 and the target current value Itgt calculated in step S2 (step S5).

Subsequently, the ECU 200 calculates the deviation ΔI between the target current value Itgt and the actual current value Ir (step S6).

Subsequently, the ECU 200 executes feedback control over current that should be flowed to the solenoid 121a by the PI control unit 221 using the proportional gain Kp determined in step S5 (step S7).

Here, in the present embodiment, the reason why the proportional gain Kp is determined with the use of the gain determination map (see FIG. 3) will be described.

An existing proportional gain in current feedback control over a belt clamping pressure control linear solenoid valve is fixed to a set value, so, particularly, there is the following problem.

For example, when the proportional gain Kp is small, current fluctuates at a low frequency in a high fluid temperature range, so hunting of current occurs. Thus, the hydraulic pressure corresponding to the belt clamping pressure fluctuates, and a belt slip occurs.

That is, as the proportional gain Kp reduces, the response of current decreases as compared to the case where the proportional gain Kp is large. In addition, in a high fluid temperature range, the electric resistance of the solenoid increases, so the response of current decreases also due to such an increase in the resistance value.

Due to such a decrease in the response of current, a deviation between the actual current value and target current value of the solenoid increases, and it becomes difficult for the actual current value to coincide with the target current value even when current feedback control is executed at predetermined intervals. Therefore, a gain Ki of the integral term in current feedback control increases by the time when the actual current value coincides with the target current value.

As the gain Ki of the integral term increases, the actual current value repeatedly overshoots and undershoots with respect to the target current value after the actual current value coincides with the target current value as well, so hunting of current occurs. As a result, particularly, in a high fluid temperature range, when the proportional gain Kp is small, hunting of current occurs, and, as a result, a belt slip occurs.

On the other hand, when the proportional gain Kp is large, the current value that is flowed to the solenoid sticks to a maximum value in a low fluid temperature range or a high current range. Thus, in the case where the belt clamping pressure control linear solenoid valve is of a normally open type, the belt clamping pressure is a minimum pressure, and, as a result, a belt slip occurs.

That is, in a low fluid temperature range, the response of hydraulic pressure is low because of the viscosity of hydraulic fluid; however, the electric resistance of the solenoid is low, so the response of current increases. Thus, a disturbance on the solenoid due to hydraulic pressure fluctuations reduces. Therefore, in a low fluid temperature range, not so high feedback gain (here, proportional gain) is required. Despite this situation, as described above, when the proportional gain Kp is large, a current value that is flowed to the solenoid easily overshoots with respect to the target current value. Thus, hunting of current occurs. Particularly, in a high current range in which the target current value is set to a high current side, a current amplitude at the time of hunting of current increases.

At the time of increasing current in a stepwise manner, a deviation between the target current value and the actual current value further increases due to an overshoot of the actual current value with respect to the target current value.

Furthermore, in the case where the belt clamping pressure control linear solenoid valve is of a normally open type, at a low hydraulic pressure side, that is, a high current side, as the deviation between the target current value and the actual current value and the proportional gain Kp increase, the duty value increases.

For this reason, at a low hydraulic pressure side (high current side), as the proportional gain Kp increases or as the deviation increases, the duty value obtained as a result of calculation tends to exceed 100%. When the duty value exceeds 100%, the duty value of 100% is continuously output from the ECU 200 until the duty value becomes lower than 100%. As a result, a period of time during which the duty value of 100% is output extends, and the current value that is flowed to the solenoid sticks to the maximum value.

In the present embodiment, in order to solve such an existing problem, an optimal proportional gain Kp is determined as needed on the basis of the fluid temperature To and the target current value Itgt with the use of the gain determination map 210 (see FIG. 3).

Specifically, as the fluid temperature To increases and as the target current value Itgt decreases, a larger proportional gain Kp is determined. Thus, hunting of current in current feedback control is prevented. In addition, as the fluid temperature To decreases and as the target current value Itgt increases, a smaller proportional gain Kp is determined. Thus, sticking of the current value to the maximum value in current feedback control is prevented.

Therefore, as in the case of the present embodiment, a belt slip is effectively suppressed by using the proportional gain Kp determined by the gain determination map 210 (see FIG. 3) in current feedback control over the belt clamping pressure control linear solenoid valve 121.

As described above, the control device for an automatic transmission according to the present embodiment increases the proportional gain Kp in current feedback control as the fluid temperature To increases, so it is possible to increase the response of current flowing through the solenoid 121a in the case where the fluid temperature To is high. Thus, it is possible to prevent an excessive integral term in current feedback control. Thus, it is possible to suppress hunting of current due to an excessive integral term in current feedback control. As a result, in the present embodiment, it is possible to suppress occurrence of a belt slip due to periodical fluctuations in belt clamping pressure.

In addition, in the case where the fluid temperature To is low, the proportional gain Kp in current feedback control is reduced, so it is possible to prevent an excessively high duty value of the solenoid 121a. Thus, it is possible to suppress sticking of current, flowing through the solenoid 121a, to the maximum value. As a result, in the present embodiment, it is possible to suppress occurrence of a belt slip as a result of a minimum belt clamping pressure due to sticking of current, flowing through the solenoid 121a, to the maximum value.

The control device for an automatic transmission according to the present embodiment reduces the proportional gain Kp in current feedback control as the target current value Itgt increases, so it is possible to reduce the proportional gain Kp in a high current range in which the duty value of the solenoid 121a easily increases. Therefore, in a high current range in which the target current value Itgt is high, it is possible to prevent an excessively high duty value of the solenoid 121a. Thus, it is possible to suppress sticking of current, flowing through the solenoid 121a, to the maximum value. As a result, it is possible to suppress the above-described occurrence of a belt slip.

In the present embodiment, the description is made on an example in which the solenoid valve according to the invention is applied to the belt clamping pressure control linear solenoid valve 121. However, the solenoid valve according to the invention may also be applied to any one of the shift control first solenoid valve 111, the shift control second solenoid valve 112, the line pressure control linear solenoid valve 131 and the lockup engagement pressure control linear solenoid valve 141.

In the case where the solenoid valve according to the invention is applied to any one of these solenoid valves, it is possible to suppress hunting of current and sticking of current to the maximum value in current feedback control over each solenoid valve.

Thus, it is possible to obtain a desired speed ratio in the shift control first solenoid valve 111 and the shift control second solenoid valve 112 that are used in shift control. That is, it is possible to prevent impairment of drivability as a result of fluctuations in speed ratio due to hunting of current or sticking of current to the maximum value.

In addition, in the lockup engagement pressure control linear solenoid valve 141 that is used to control the engagement pressure of the lockup clutch 22, it is possible to keep an optimal lockup clutch engagement pressure. That is, it is possible to prevent a situation that, for example, the engaged state of the lockup clutch 22 is unintentionally released or a desired slip state is not kept due to hunting of current or sticking of current to the maximum value. This leads to improvement in drivability.

Furthermore, in the line pressure control linear solenoid valve 131 that is used to control the line pressure, it is possible to suppress fluctuations in line pressure.

In the present embodiment, the belt clamping pressure control linear solenoid valve 121 is formed of a normally open-type solenoid valve; however, it is not limited to this configuration. The belt clamping pressure control linear solenoid valve 121 may be formed of a normally closed-type solenoid valve. In this case, it is possible to prevent fluctuations in belt clamping pressure due to hunting of current, and it is possible to prevent an excessively high belt clamping pressure due to sticking of current to the maximum value, so it is possible to prevent influence on the durability of the transmission belt 43.

In the present embodiment, the proportional gain Kp is determined on the basis of the fluid temperature To and the target current value Itgt with the use of the gain determination map shown in FIG. 3; however, it is not limited to this configuration. For example, the proportional gain Kp may be determined on the basis of any one of the fluid temperature To and the target current value Itgt. In this case, for example, a two-dimensional map in which the correlation between a fluid temperature To (or a target current value Itgt) and a proportional gain Kp is empirically obtained and stored in advance is used.

In the present embodiment, so-called PI control is used as a mode of current feedback control; however, it is not limited to this configuration. For example, PID control that adds a derivative term, derived from the time derivative value of a speed deviation and a derivative gain, to PI control may also be used.

In the present embodiment, the description is made on an example in which the solenoid valve according to the invention is applied to various solenoid valves that are used in control over the CVT 4. However, the solenoid valve according to the invention is not limited to various solenoid valves that are used in control over the CVT 4. It is also applicable that various solenoid valves are used in control over a step-gear automatic transmission.

As described above, the control device for an automatic transmission according to the invention is able to suppress hunting of current and sticking of current to the maximum value in feedback control over the current value of the solenoid valve that controls the hydraulic actuator, and is useful in a control device for an automatic transmission that includes various solenoid valves that control various hydraulic actuators.

What is claimed is:
1. A control device for an automatic transmission including i) a hydraulic actuator that is actuated based on a hydraulic pressure supplied and ii) a solenoid valve that controls the hydraulic pressure supplied to the hydraulic actuator by outputting an input hydraulic pressure regulated based on a driving current of a solenoid, the control device comprising:

a fluid temperature detecting unit configured to detect a temperature of hydraulic fluid that is supplied to the hydraulic actuator; and a control unit configured to execute feedback control over a current value of the driving current that is flowed to the solenoid using at least a proportional term and an integral term based on a deviation between a target current value of the driving current to be flowed to the solenoid and a current value of the driving current actually flowed to the solenoid such that the hydraulic pressure supplied to the hydraulic actuator becomes a target hydraulic pressure, the control unit being configured to increase a proportional gain in the feedback control as the temperature of the hydraulic fluid, detected by the fluid temperature detecting unit, increases, the control unit being configured to reduce the proportional gain in the feedback control as the target current value increases.

2. The control device according to claim 1, wherein the automatic transmission is a belt-drive continuously variable transmission including i) a primary pulley configured to vary a winding radius of a belt by varying a groove width of the primary pulley and ii) a secondary pulley configured to generate a belt clamping pressure for clamping the belt, the automatic transmission is connected to a driving force source via a lockup clutch, and at least one of shift of the belt-drive continuously variable transmission, the belt clamping pressure, an engagement pressure of the lockup clutch or a line pressure is controlled through the solenoid valve.

3. The control device according to claim 2, wherein the solenoid valve is a normally open solenoid valve, and the belt clamping pressure is controlled through the solenoid valve.

4. The control device according to claim 2, wherein the solenoid valve is a normally closed solenoid valve, and the belt clamping pressure is controlled through the solenoid valve.

* * * * *